United States Patent [19]

Archer

[11] Patent Number: 5,579,638
[45] Date of Patent: Dec. 3, 1996

[54] ADJUSTABLE EXHAUST SYSTEM

[76] Inventor: Bertie T. Archer, 103 W. Baltimore Ave., Clifton Heights, Pa. 19018

[21] Appl. No.: 254,179

[22] Filed: Jun. 6, 1994

[51] Int. Cl.$^6$ .................................................. F02B 27/06
[52] U.S. Cl. .............................. 60/312; 60/314; 285/303
[58] Field of Search .................... 60/312, 314; 285/298, 285/303, 38, 39

[56] References Cited

U.S. PATENT DOCUMENTS

| 503,818 | 8/1893 | Watt | 285/303 |
|---|---|---|---|
| 2,102,559 | 8/1934 | Kadenacy | 60/314 |
| 3,254,484 | 6/1966 | Kopper | 60/312 |
| 3,726,092 | 4/1973 | Raczuk | 60/314 |

FOREIGN PATENT DOCUMENTS

| 4105057 | 8/1992 | Germany | 60/312 |
|---|---|---|---|
| 0108121 | 8/1979 | Japan | 60/312 |
| 0112823 | 9/1980 | Japan | 60/312 |
| 0028015 | 2/1984 | Japan | 60/312 |

*Primary Examiner*—Leonard E. Heyman
*Attorney, Agent, or Firm*—Cesari and McKenna

[57] ABSTRACT

An adjustable-length exhaust system for use with two-cycle motors is disclosed. An insert section of pipe is interposed between a header pipe and a conventional tail pipe so that, when it is rotated, the overall length of the exhaust system is adjusted. The insert section is held in place between the tail pipe and a header extension pipe by a compressive force exerted by one or more springs attached between the header and the tail pipe. The insert features, on an end that slips over the header extension section, a series of graduated notches which mate with a protrusion, or "stop", formed on the mating end of a header extension section. This notch and stop combination determines the distance by which the insert section will be permitted to slip over the header extension section, and correspondingly, the overall length of the exhaust system.

5 Claims, 2 Drawing Sheets

ADJUSTABLE EXHAUST SYSTEM

FIELD OF THE INVENTION

This invention relates generally to exhaust systems, and more specifically to an adjustable exhaust system for use with a two-cycle engine.

BACKGROUND OF THE INVENTION

In the world of go-cart racing one-hundred mile races are won, and lost, by mere inches. Naturally, with margins this narrow, any advantage is important and, although engine displacement and other performance-related parameters are tightly regulated, some performance-enhancing adjustments are permitted. For example, racers may change tires during a race to match driving conditions. As a result, soft rubber tires are typically used on a cold track to improve traction, while harder tires, which reduce rolling resistance and permit higher speeds, are used on a warmer track.

Additionally, one may adjust the exhaust system of a cart to enhance performance; a long exhaust pipe yields more revolutions per minute (RPMs) at the expense of lower torque. This trade-off would be advantageous on a long track, where a lower percentage of time is spent in the corners than on a short track. Conversely, a short exhaust pipe would be desirable for operation on a short track.

Rather than hauling exhaust pipes of various lengths from race track to race track, racers generally adjust their exhaust system's length before a race by inserting an appropriate length of exhaust pipe between the header pipe of the engine and the tail pipe. Using this approach, racers may tone adjust the performance of their cart depending upon the length of the track they will be racing on.

However, certain other factors, such as barometric pressure, also affect performance and they too can be accommodated by adjusting the length of the exhaust system. Because such environmental conditions may change immediately before, or even during a race, it is difficult if not impossible to determine the most advantageous length of pipe to use. Therefore, racers typically adjust the exhaust systems by replacing the exhaust pipe insert during a race with one that is longer or shorter, depending upon what change (e.g., greater torque or greater RPMs) is desired.

Unfortunately, to change an exhaust system pipe section is both a time-consuming and hazardous task. All the parts being replaced are extremely hot, yet bolts, clamps and a section of pipe must be removed and replaced. Although the mechanics who replace the pipe sections typically protect their hands with gloves, the gloves diminish their dexterity, thus slowing the operation. And even though the gloves are heavy and insulated mechanics nonetheless often sustain severe burns.

SUMMARY OF THE INVENTION

Briefly, the invention is an exhaust system for a two cycle engine consisting of two sections of exhaust pipe which operate in concert to permit "tuning" of an exhaust system for optimum performance. A first, "insert", section of pipe, is situated between a conventional tail pipe on one end and a second, "header extension", section of pipe on the other. One end of the insert section slips over an end of the header extension section. The other end of the insert section slips inside the conventional tail pipe. The other end of the header extension section attaches in a conventional manner to an engine header pipe. Adjustments to the overall exhaust system length may be made by rotating and shifting the insert section longitudinally with respect to the header extension section. As a result, one may quickly and conveniently adjust the overall length of the exhaust system, thereby adjusting the performance of the engine.

More specifically, the insert section is held in place between the conventional tail pipe and the second section of pipe by a compressive force exerted by springs attached between the second section and the conventional pipe. The insert section features, on the end that slips over the second section, a series of graduated notches which mate with a protrusion, or "stop", formed on the mating end of the second section. The notch and stop combination determines the distance the first section will be permitted to slip over the second section, and correspondingly, the overall length of the exhaust system.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
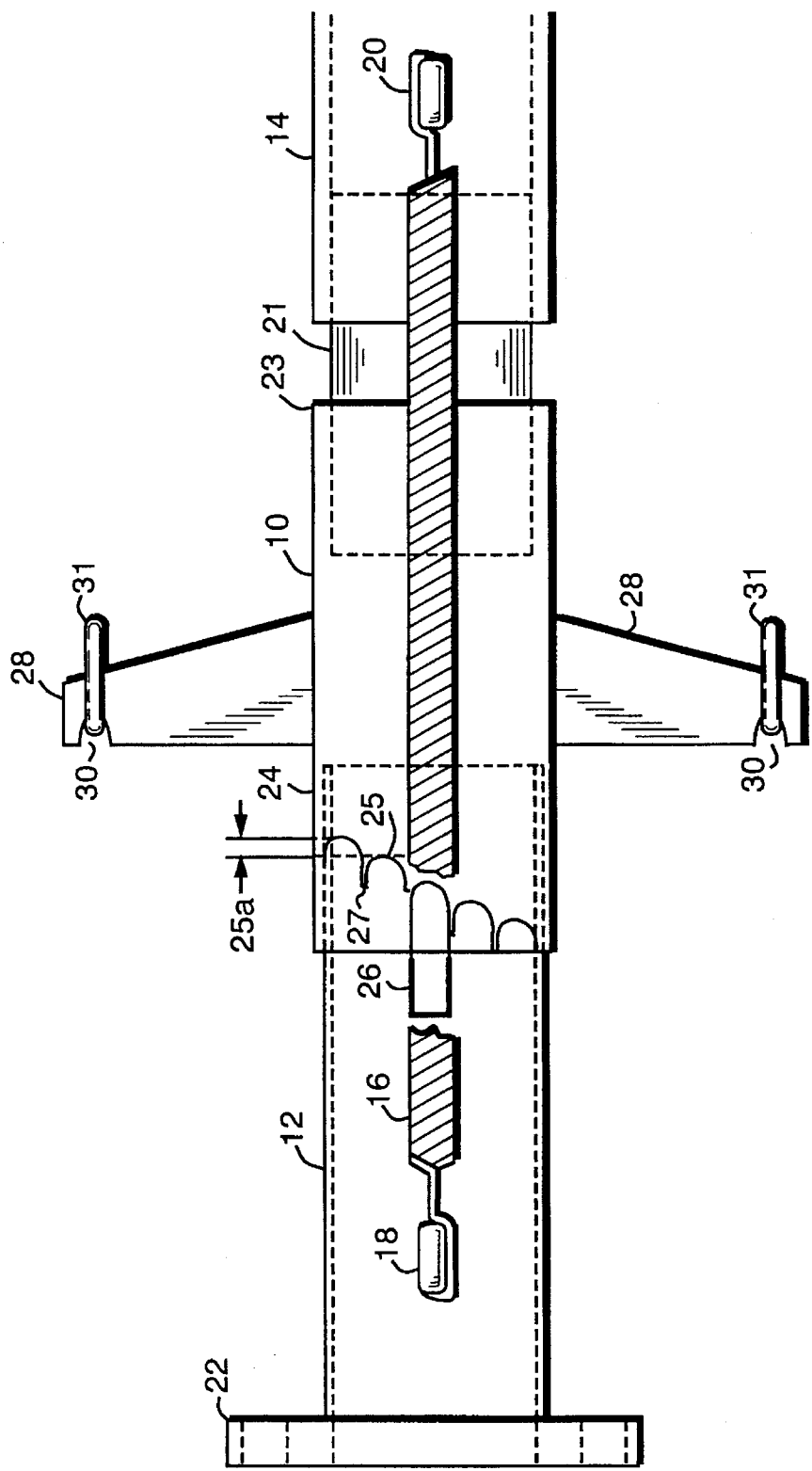
FIG. 1 is a top plan view of the inventive exhaust system.

FIG. 1 is a top plan view of one embodiment of the invention. A first, or so-called "insert", section of pipe 10 is compressed between a second, or so-called "header extension" pipe 12 and a conventional tail pipe section 14 by springs 16. The springs 16 are attached on one end to spring clips 18 disposed on the extension section of pipe 12 and, on the other end, to spring clips 20 on the conventional tail pipe 14. One end of the header extension pipe is connected, in a conventional fashion, through a flange 22 to a header pipe (not shown) on the engine. Other pipes, mufflers or pollution control devices, not shown, may be located within the exhaust system. Their presence, absence or location is irrelevant to operation of the invention. For example, although a muffler may be connected to the tail pipe 14 on the end opposite the insert section 10 and another pipe connected from the other end of the muffler to the environment, the pipe 14 will be referred to as a tail pipe.

A first end 21 of the insert 10 is of a slightly smaller outside diameter than the inside diameter of the tail pipe 14 so that the first end 21 fits snugly inside tail pipe 14 up to stop 23. The stop 23 is formed as a section of the insert 10 which has a greater outside diameter than the inside diameter of the tail pipe 14.

The second end 24 of the insert 10 has a greater inside diameter than the header extension pipe 12 so that the second end 24 of the insert 10 fits snugly over the header extension pipe 12.

The second end of the insert 10 also features notches 25 which are graduated in length. Fingers 27 are thus formed between adjacent notches 25. The notches 25 mate with a stop 26 formed on the header extension pipe 12 so that the compressive force of the spring 16 holds the insert 10 in position relative to the pipe 12.

Thus, the distance between the stop 26 and the stop 23, and, consequently, the overall length of the exhaust system, may be modified according to which one of the notches 25 is positioned to mate with the stop 26. The length of the exhaust system may be adjusted in increments 25a, which are the distances between corresponding ends of contiguous notches 25. The increment distances 25a are typically ¼ inch apiece for a pipe which is two inches in diameter.

In operation, the length of the assembled exhaust system is adjusted by pulling the insert 10 longitudinally (that is, by pulling the insert 10 to the right in FIG. 1) until the stop 26 clears the fingers 27. The insert 10 is then rotated until the desired one of the notches 25 is aligned with the stop 26. When the selected notch 25 is properly aligned in this fashion, the insert 10 is then released, thereby allowing the spring 16 to hold the insert 10 in position against the stop 26.

Vanes 28 located on the insert 10 also aide in positioning the insert 10. One may use them, for example, to assist in pulling the insert 10 and tailpipe 14 combination apart so as to disengage a notch 25 from the stop 26, thereby permitting rotation of the insert 10 into another desired position.

Handle notches 30 may be formed in the vanes 28 to provide a mating structure for handles 31 that loop over the vanes 28. In general, the handles 31 are not attached to the vanes 28 during operation of the associated engine. Rather, they are used to provide an insulated gripping surface for manipulating the insert 10. The handles 31 may be any of a variety of shapes: a loop (as illustrated), hook, "C", etc. The only restriction is that one section of the handle fit in a handle notch 30, thereby providing a gripping surface which is isolated from the vane 28, which becomes hot during operation of the engine.

Figure 2:
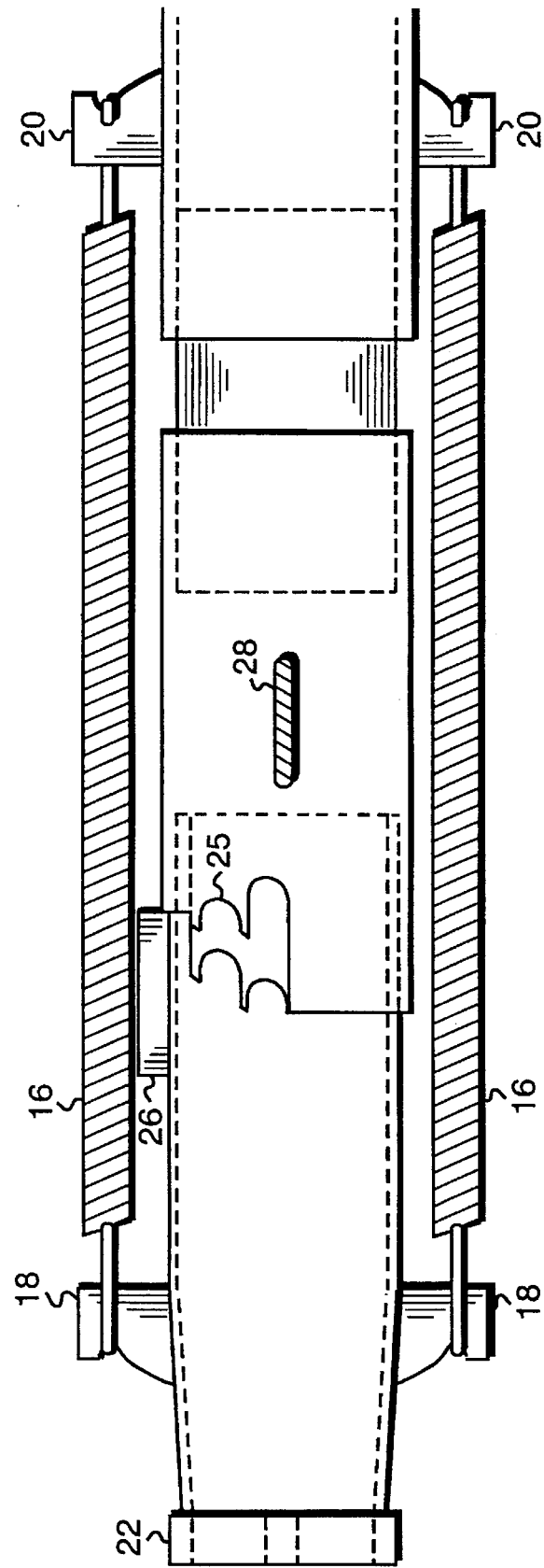
FIG. 2 is a side view of the inventive exhaust system.

FIG. 2 is a side view of the exhaust system which illustrates how the two springs 16 and two sets of spring clips 18 and 20 are employed to hold the insert 10, and more particularly, how the notch 25 is held in a selected position against the stop 26.

The foregoing description has been limited to a specific embodiment of this invention. It will be apparent, however, that variations and modifications may be made to the invention, with the attainment of some or all of its advantages. Illustratively, the inventive concepts may be used in situations other than that described above. For example, Therefore, it is the object of the appended claims to cover all such variations and modifications as come within the true spirit and scope of the invention.

What is claimed is:

1. An adjustable-length exhaust system for use with a two-cycle engine comprising:

a first, insert section of pipe for attachment to a tail pipe;

a second extension section of pipe for attachment on one end to a header pipe of an engine; the insert section of pipe being interposed between the extension section and the tail pipe and such that when the insert and extension sections are joined together, they therefore form a conduit for exhaust gases from the header to the tail pipe; and means for adjusting the length through which the insert section of pipe conducts gases from the extension section of pipe to the tail pipe wherein the means for adjusting includes means for rotating the insert section of pipe relative to the extension section of pipe.

2. An adjustable-length exhaust system for use with a two-cycle engine comprising:

a first, insert section of pipe for attachment to a tail pipe;

a second, extension section of pipe for attachment on one end to a header pipe of an engine; the insert section of pipe being interposed between the extension section and the tail pipe and, such that when the insert and extension sections are joined together, they therefore form a conduit for exhaust gases from the header to the tail pipe;and means for adjusting the length through which the insert section of pipe conducts gases from the extension section of pipe to the tail pipe, wherein the means for adjusting includes means for rotating the insert section of pipe relative to the extension section of pipe, and wherein the means for adjusting comprises:

a first stop formed on another end of the extension section of pipe;

a series of graduated notches formed in a first end of the insert section of pipe for mating abutment to the first stop; and a second stop formed in a second end of the insert section of pipe for mating abutment to the tail pipe.

3. The adjustable-length exhaust system as in claim 2 wherein the means for adjusting further comprises one or more springs disposed to cooperate with the stops and notches thereby holding the insert section of pipe in a desired position relative to the extension section of pipe.

4. An adjustable-length exhaust system for use with a two-cycle engine comprising:

a first insert section of pipe for attachment to a tail pipe;

a second extension section of pipe for attachment on one end to a header pipe of an engine; the insert section of pipe being interposed between the extension section and the tail pipe and, such that when the insert and extension sections are joined together, they therefore form a conduit for exhaust gases from the header to the tail pipe; and means for adjusting the length through which the insert section of pipe conducts gases from the extension section of pipe to all the tail pipe wherein the insert section of pipe includes vanes rigidly attached to the insert section of pipe and fixed with respect thereto to aid in rotating the insert section of pipe.

5. The adjustable-length exhaust system of claim 5, wherein the vanes include notches formed therein for cooperative operation with handles used to shift and rotate the insert section of pipe relative to the extension section of pipe.

* * * * *